(12) United States Patent
Miyashita

(10) Patent No.: US 8,615,172 B2
(45) Date of Patent: Dec. 24, 2013

(54) RELAY STATION ARRANGEMENT METHOD AND RELAY STATION ARRANGEMENT DEVICE

(75) Inventor: Takuya Miyashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 13/206,049

(22) Filed: Aug. 9, 2011

(65) Prior Publication Data

US 2011/0293269 A1 Dec. 1, 2011

Related U.S. Application Data

(63) Continuation of application No. PCT/JP2009/055087, filed on Mar. 16, 2009.

(51) Int. Cl.
*H04B 10/02* (2011.01)

(52) U.S. Cl.
USPC ........... 398/175; 398/177; 398/181; 398/147; 398/158; 398/159; 398/81; 398/160; 398/33; 398/37; 398/25

(58) Field of Classification Search
USPC ............... 398/25, 26, 27, 79, 34, 37, 38, 173, 398/175, 176, 177, 180, 181, 158, 159, 160, 398/147, 81, 33, 183, 188
See application file for complete search history.

(56) References Cited

U.S. PATENT DOCUMENTS

| | | | |
|---|---|---|---|
| 7,336,870 B2 * | 2/2008 | Ooi et al. | 385/24 |
| 7,505,414 B2 * | 3/2009 | Nakashima et al. | 370/238 |
| 2005/0226629 A1 | 10/2005 | Ooi et al. | |
| 2006/0023641 A1 | 2/2006 | Nakashima et al. | |
| 2006/0193554 A1 | 8/2006 | Ooi et al. | |
| 2008/0144993 A1 | 6/2008 | Bottari et al. | |

FOREIGN PATENT DOCUMENTS

| | | |
|---|---|---|
| JP | 2004-48477 | 2/2004 |
| JP | 2005-86521 | 3/2005 |
| JP | 2005-295126 | 10/2005 |
| JP | 2006-42279 | 2/2006 |
| JP | 2006-245706 | 9/2006 |
| JP | 2008-507223 | 3/2008 |

OTHER PUBLICATIONS

International Search Report for PCT/JP2009/055087, Mailed Apr. 14, 2009.

\* cited by examiner

*Primary Examiner* — Hanh Phan
(74) *Attorney, Agent, or Firm* — Staas & Halsey LLP

(57) ABSTRACT

A method for arranging relay stations in an optical transmission system including relay stations arranged so that optical signals at a first transmission speed can be transmitted from a transmission end to a reception end, includes: judging whether a transmission of optical signals at a second transmission speed different from the first transmission speed in a section connecting arbitrary two of the relay stations where a regenerative repeater station capable of regenerating optical signals can be arranged is possible; determining a combination of sections judged to be capable of performing transmission that enables a transmission of optical signals from the transmission end to the reception end; and making both ends of respective sections of the determined combination be the relay stations where the regenerative repeater station is arranged, wherein the judging includes a judgment condition which is satisfied in a section including sections but unsatisfied in one of the sections.

8 Claims, 10 Drawing Sheets

RELAY STATION ARRANGEMENT METHOD AND RELAY STATION ARRANGEMENT DEVICE

CROSS-REFERENCE TO RELATED APPLICATION

This application is a continuation application of PCT/JP2009/055087 filed Mar. 16, 2009, the contents of which are herein wholly incorporated by reference.

FIELD

A certain aspect of the embodiments discussed herein is related to a relay station arrangement method and a relay station arrangement device.

BACKGROUND

A WDM (Wavelength Division Multiplexing) system multiplexing optical signals having different wavelengths is utilized as an optical transmission system. In addition, in a 10-Gbps optical transmission system, a NRZ (Non Return Zero) modulation system that modulates the optical intensity is utilized. In addition, in order to achieve the high-speed transmission, in 40-Gbps and 100-Gbps optical transmission systems, phase modulation systems such as a QPSK (Quadrature Phase Shift Key) modulation system and a DQPSK (Differential Quadrature Phase Shift Key) modulation system are considered.

An optical transmission system is formed from relay stations. The transmission of a desired optical signal becomes possible by arranging a regenerative repeater station capable of regenerating an optical signal in some of relay stations. Japanese Laid-Open Patent Publication No. 2004-48477 discloses a method of arranging a regenerative repeater station in an optical transmission system including relay stations.

SUMMARY

According to an aspect of the present invention, there is provided a method for arranging relay stations in an optical transmission system including a plurality of relay stations arranged so that an optical signal at a first transmission speed can be transmitted from a transmission end to a reception end; the method including: judging whether a transmission of an optical signal at a second transmission speed which is different from the first transmission speed in a section connecting arbitrary two of the plurality of relay stations in which a regenerative repeater station capable of regenerating an optical signal can be arranged is possible; determining a combination of sections judged to be capable of performing transmission that enables a transmission of an optical signal from the transmission end to the reception end; and making both ends of respective sections of the determined combination be the relay stations where the regenerative repeater station is arranged, wherein in the judging, a judgment condition which is satisfied in a section including a plurality of sections but unsatisfied in one of the plurality of sections is included.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When arranging relay stations in an optical transmission system, it is desirable that the number of arranged regenerative repeater stations is small as much as possible because a regenerative repeater station is expensive. On the other hand, it is desirable to improve a signal quality of an optical signal transmitted through the optical transmission system. There is a case that optical signals at different transmission speeds such as a 10-Gbps optical signal and a 40-Gbps optical signal are transmitted in the optical transmission system. In this case, it is desired to arrange the regenerative repeater station properly.

A description will now be given of embodiments of the present invention with reference to accompanied drawings.

First Embodiment

Figure 1A:
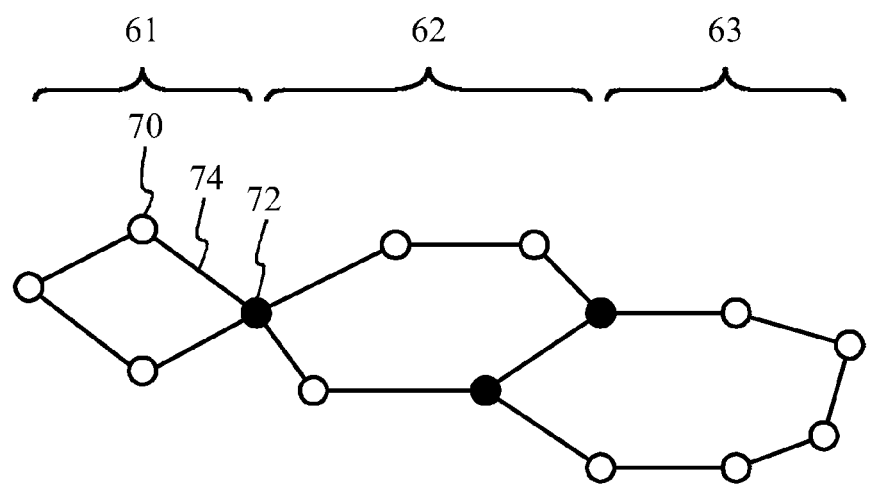
FIG. 1A is a diagram illustrating an optical transmission network using a relay station arrangement method.

FIG. 1A is a diagram illustrating an example of a network using a present transmission system where relay stations are arranged. A WDM system is used in the present transmission system for example, and optical signals at different transmission speeds (10-Gbps and 40-Gbps optical signals for example) are transmitted. As illustrated in FIG. 1A, three ring-shaped partial sections 61 through 63 are coupled in a network 60. Partial sections 61 through 63 include relay stations 70 and 72, and a transmission path 74 such as an optical fiber connecting relay stations 70 and 72. The relay station 72 is a relay station to which optical signals are input from multiple transmission paths 74 or from which optical signals are output to multiple transmission paths 74, and is an optical HUB for example. The relay station 70 is a relay station to which an optical signal is input from one transmission path 74, and from which an optical signal is output to one transmission path 74, and is an OADM (Optical add/drop Multiplexer), an ILA (In Line Amplifier), or a bypass, for example.

Figure 1B:
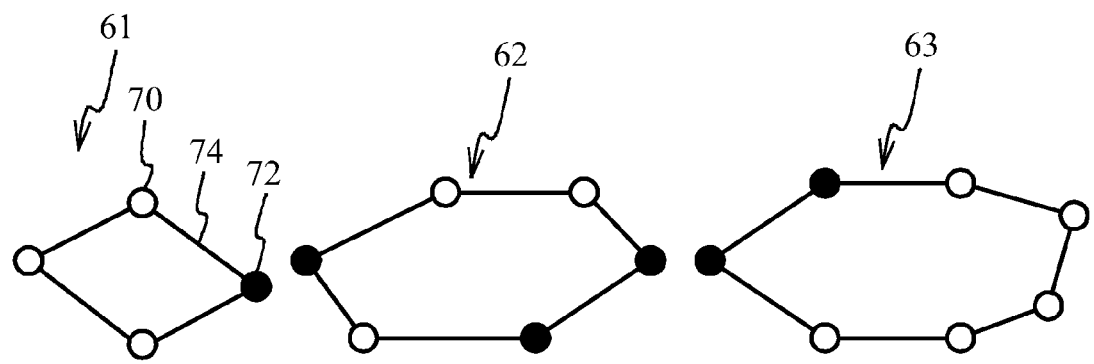
FIG. 1B is a diagram where the optical transmission network is divided into sections.

When selecting each relay station, the network 60 is divided into partial sections 61 through 63 for example, as illustrated in FIG. 1B. Relay stations are selected in each of partial sections 61 through 63 so that a desired optical signal can be transmitted. After that, it is evaluated whether the desired optical signal can be transmitted among relay stations connecting partial sections 61 through 63. Each relay station is selected as described above. In FIG. 1B, a network is divided into ring-shaped partial sections 61 through 63, but may be divided into linear partial sections.

Figure 2:
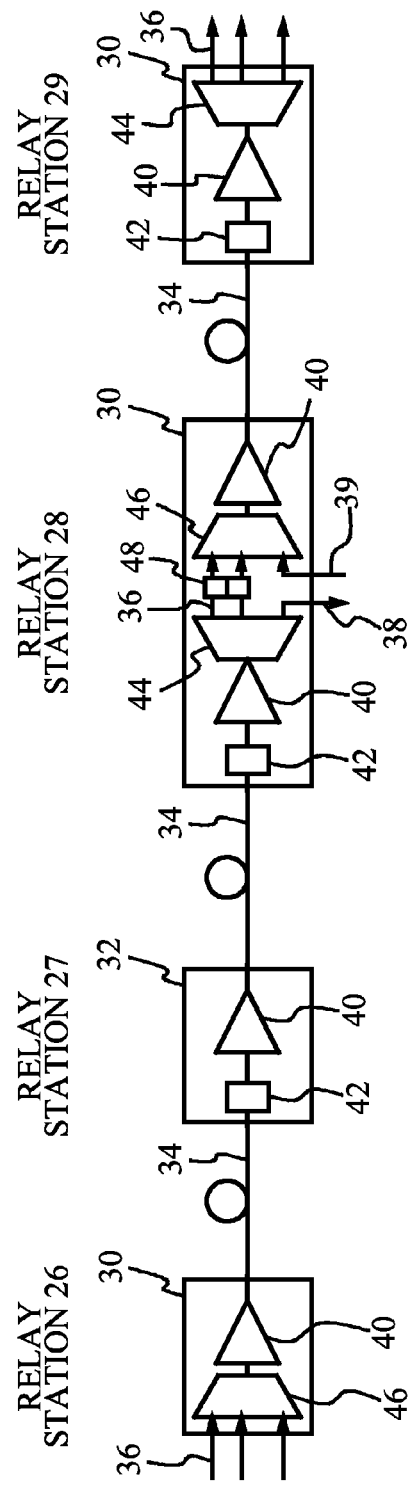
FIG. 2 is a diagram explaining each relay station.

FIG. 2 is a diagram for explaining each relay station. Relay stations 26 through 28 are connected through transmission paths 34 such as an optical fiber. Relay stations 26, 28 and 29 are OADMs 30, and the relay station 27 is an ILA 32. The ILA 32 is a relay station that amplifies the optical signal and controls the wavelength dispersion. The ILA 32 includes an amplifier 40 and a DCM (Dispersion Compensation Module) 42 for example. The amplifier 40 is an EDFA (Erbium-doped Fiber Amplifier) for example, and amplifies the optical signal. The DCM 42 compensates the wavelength dispersion. In the ILA 32, it is possible to obtain the desired gain and the dispersion characteristic by providing the desired amplifier 40 and the desired DCM 42.

The OADM 30 separates the optical signal formed by combining optical signals having different wavelengths, and combines them again in addition to amplifying the optical signal and controlling the wavelength dispersion. The OADM 30 includes the amplifier 40, the DCM 42, a branching filter 44, a multiplexer 46, and an REG (regenerator) 48 for example. The branching filter 44 separates the optical signal into lights of different wavelengths. The multiplexer 46 combines lights of different wavelengths. The REG 48 converts the optical signal into the electrical signal, regenerates the signal, and converts the electrical signal into the optical signal again. The optical signals separated by the branching filter 44 are outputted to the transmission paths 36 with respect to each wavelength. Some of separated optical signals may be dropped from the transmission path 38. The optical signals of respective wavelengths in transmission paths 36 are combined in the multiplexer 46, and outputted to the transmission path 34. Some of optical signals to be combined can be added from the transmission path 39. Some of or all of separated optical signals can be regenerated by the REG 48.

The OADM 30 including the REG 48 is a regenerative repeater station that regenerates and relays the optical signal. The regenerative repeater station equalizes, re-times, and recognizes and regenerates (3R) the optical signal. According to this, the regenerative repeater station can reset and regenerate the optical signal of which the optical SN (Signal to Noise) ratio or the wavelength dispersion characteristic is deteriorated to such an extent that the amplifier 40 and the DCM 42 cannot improve it. Therefore, the optical signal having a good SN ratio and almost no wavelength dispersion is output from the regenerative repeater station.

When arranging relay stations, it is determined which of the ILA 32, the OADM 30, and the bypass where neither ILA 32 nor OADM 30 is arranged is arranged in each relay station. In addition, it is determined what characteristics the amplifier 40 and the DCM 42 arranged in the ILA 32 and OADM 30 have. Furthermore, it is determined whether to arrange the OADM 30 including the REG 48 to make the relay station be the regenerative repeater station.

Figure 3A:
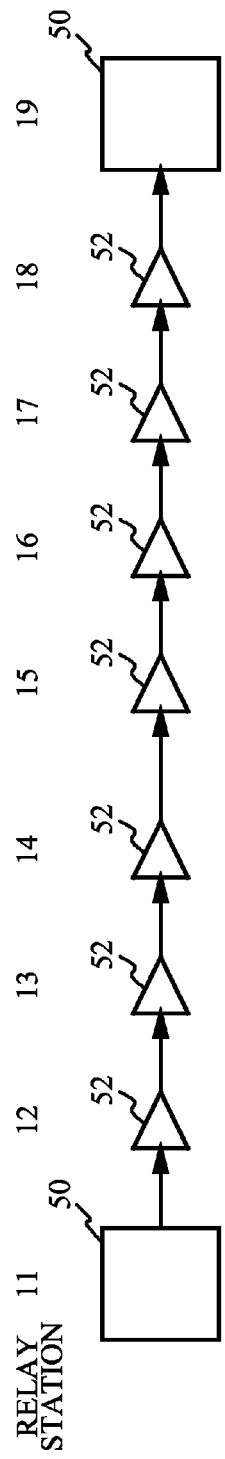
FIG. 3A and FIG. 3B are diagrams illustrating an optical transmission system that transmits an optical signal from a transmission end to a reception end.
Figure 3B:
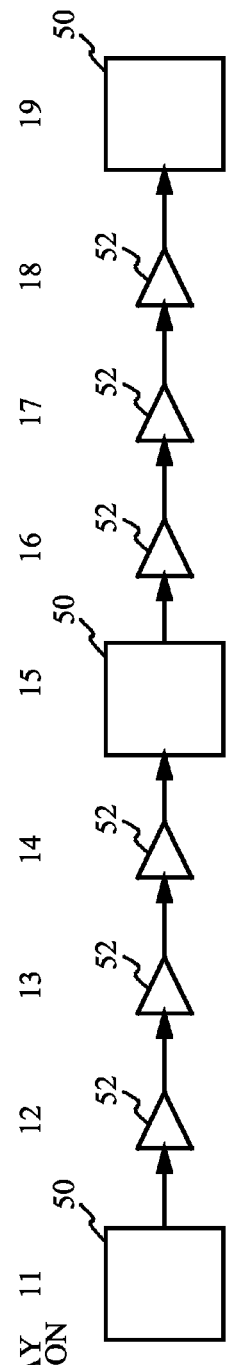

A description will now be given of a method of arranging the regenerative repeater station in a case of transmitting an optical signal at a single transmission speed (e.g. 10 Gbps). FIG. 3A and FIG. 3B illustrate an optical transmission system that transmits an optical signal from a transmission end 11 to a reception end 19. The optical transmission system includes relay stations 12 through 18 between the transmission end 11 and the reception end 19. The transmission end 11 and the reception end 19 are regenerative repeater stations 50 (e.g. the OADM 30 including the REG 48).

As illustrated in FIG. 3A, relay stations 12 through 18 are non-regenerative repeater stations 52 (e.g. an ILA or a bypass) that are not the regenerative repeater station 50. In the arrangement of relay stations in FIG. 3A, the transmission of the 10-Gbps optical signal is impossible. Here, when the signal quality (optical SN ratio or dispersion characteristics) of the optical signal at the reception end 19 becomes equal to or smaller than a given value after the optical signal regenerated in the transmission end 11 passes through relay stations 12 through 18, it is judged that the transmission is impossible. When the transmission is impossible, it is impossible to regenerate the optical signal in the regenerative repeater station 50 at the reception end 19. The dashed arrow in FIG. 3A represents that the transmission is impossible.

Referring to FIG. 3B, the transmission of the optical signal from the transmission end 11 to the relay station 15 is possible. That is to say, the deterioration of the signal quality of the optical signal at the relay station 15 is equal to or greater than a given value, which means that the regeneration is possible. Therefore, it is possible to regenerate the optical signal at the relay station 15 by arranging the regenerative repeater station 50 in the relay station 15. In addition, the transmission of the optical signal from the relay station 15 to the reception end 19 is possible. That is to say, the deterioration of the signal quality of the optical signal regenerated by the relay station 15 at the reception end 19 is at an extent that the optical signal can be regenerated. As described above, when the transmission from the transmission end 11 to the relay station 15 is possible and the transmission from the relay station 15 to the reception end 19 is possible, the transmission of the optical signal from the transmission end 11 to the reception end 19 becomes possible by arranging the regenerative repeater station 50 in the relay station 15. Solid arrows in FIG. 3B represent that the transmission is possible.

As described above, when the transmission of the optical signal from the transmission end 11 to the reception end 19 is impossible, the regenerative repeater station 50 is arranged in the transmission end 11 or the reception end 19. According to this, the transmission of the optical signal from the transmission end 11 to the reception end 19 becomes possible. In addition, in the optical transmission system of the optical signal at a single transmission speed, when the transmission is possible between two regenerative repeater stations 50 (the transmission end 11 and the reception end 19) in FIG. 3A is possible, the transmission is possible between the transmission end 11 and the reception end 19 even though the regenerative repeater station 50 is further arranged between two regenerative repeater stations 50 (the transmission end 11 and the reception end 19) as illustrated in FIG. 3B.

Figure 4A:
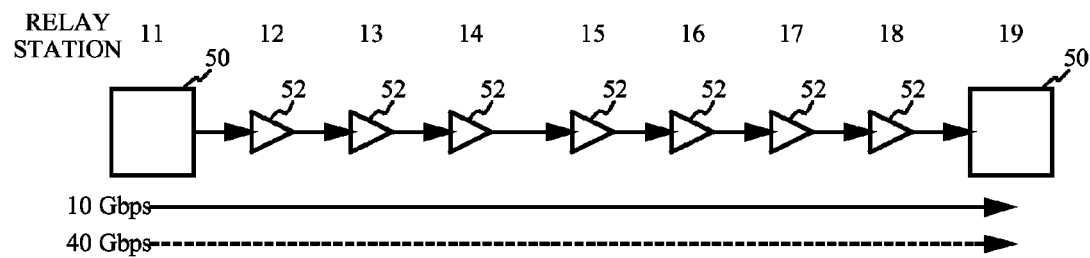
FIG. 4A through FIG. 4D are diagrams illustrating an optical transmission system that transmits an optical signal from a transmission end to a reception end.

Now, the optical transmission system that transmits optical signals at different transmission speeds (e.g. 10 Gbps and 40 Gbps) is considered. FIG. 4A through FIG. 4D illustrates an optical transmission system that transmits the optical signal from the transmission end 11 to the reception end 19. Referring to FIG. 4A, all of relay stations 12 through 18 between the transmission end 11 and the reception end 19 which are regenerative repeater stations 50 are non-regenerative repeater stations 52. In this case, the transmission of 10-Gbps optical signals from the transmission end 11 to the reception end 19 is possible. The arrangement of the regenerative repeater station 50 in a case where the optical transmission system capable of transmitting 10-Gbps optical signals transmits 40-Gbps optical signals is now considered. The transmission of 40-Gbps optical signals from the transmission end 11 to the reception end 19 is impossible.

Figure 4B:
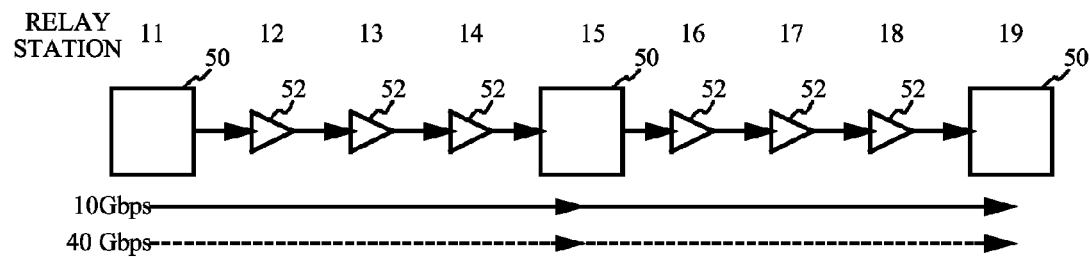

Thus, as illustrated in FIG. 4B, the regenerative repeater station 50 is arranged in the relay station 15, and non-regenerative repeater stations 52 are arranged in other relay stations 12 through 14 and 16 through 18. Both the transmission of the 40-Gbps optical signal from the transmission end 11 to the relay station 15 and the transmission of the 40-Gbps optical signal from the relay station 15 to the reception end 19 are impossible.

Figure 4C:
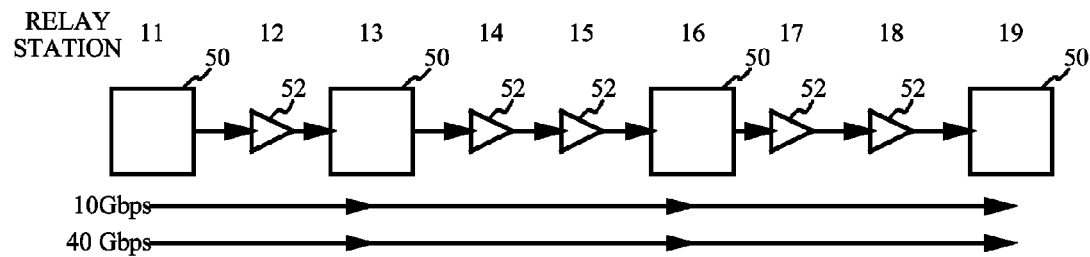

Thus, as illustrated in FIG. 4C, the regenerative repeater stations 50 are arranged in relay stations 13 and 16, and non-regenerative repeater stations 52 are arranged in other relay stations 12, 14, 15, 17 and 18. This makes the transmission of 10-Gbps and 40-Gbps optical signals possible.

Figure 4D:
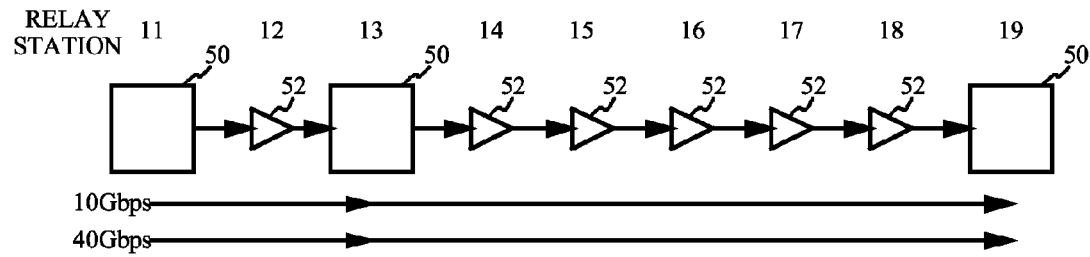

However, as illustrated in FIG. 4D, even when the regenerative repeater station 50 is arranged only in the relay station 13 and non-regenerative repeater stations 52 are arranged in other relay stations 12 and 14 through 18, there is a case that the transmission of 10-Gbps and 40-Gbps optical signals becomes possible.

When transmitting optical signals at different transmission speeds, even though the transmission is possible in the section between two regenerative repeater stations 50 (the section between the relay station 13 and the reception end 19 in FIG. 4D), there is a case that the transmission is impossible in the section (the section between the relay station 15 and the reception end 19 in FIG. 4B) included in the section between two regenerative repeater stations 50. In a case illustrated in FIG. 4A through FIG. 4D, if the regenerative repeater station 50 is arranged as illustrated in FIG. 4C even though the transmission of 40-Gbps optical signals is possible by the configuration illustrated in FIG. 4D, this results in using the regenerative repeater station 50, which is expensive, more.

A description will now be given of a reason why there is a case that the transmission is impossible in the section included in the section between two regenerative repeater stations 50 where the transmission is possible when transmitting optical signals at different transmission speeds. When two optical signals at different transmission speeds coexist, there is a case that the cross-phase modulation (XPM) occurs and the phase dispersion occurs. For example, the optical signal of which the intensity is modulated (e.g. NRZ modulation) such as the 10 Gbps optical signal, and the optical signal of which the phase is modulated (e.g. QPSK or DQPSK) such as the 40-Gbps optical signal may be transmitted. In this case, the phase of the 40-Gbps optical signal is modulated by the 10-Gbps optical signal of which the intensity is modulated. Especially, when the phases of wavelengths of 10-Gbps optical signals become coherent in the region such as the output side of the amplifier 40 where the optical intensity is large, which means that the phase dispersion is small, the great change of the optical intensity occurs. Therefore, a large XPM occurs, and the great transmission deterioration occurs in the 40-Gbps optical signal. As described above, when considering the transmission of the 10-Gbps optical signal, it is desirable to perform the wavelength dispersion compensation so that the dispersion becomes around 0. On the other hand, when considering the transmission of the 40-Gbps optical signal in addition to the transmission of the 10-Gbps optical signal, it is desirable to perform the wavelength dispersion compensation so that the dispersion does not become around 0.

Figure 5A:
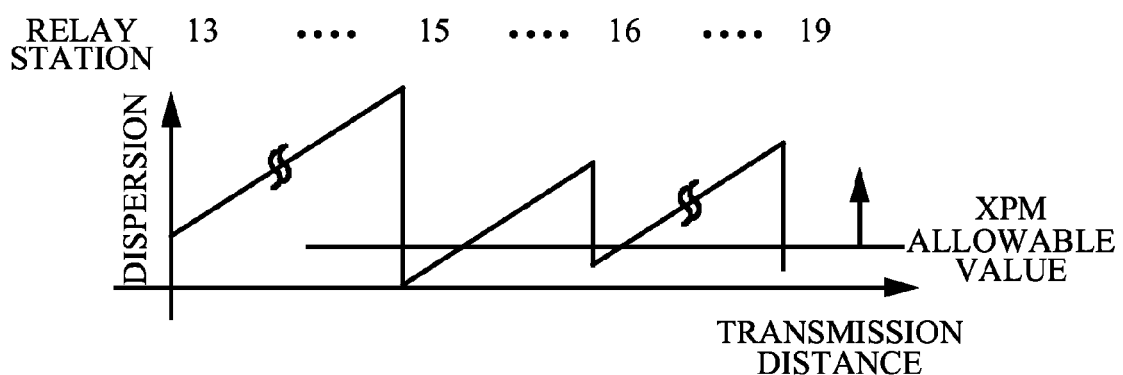
FIG. 5A and FIG. 5B are diagrams illustrating dispersion characteristics versus transmission distances of FIG. 4C and FIG. 4D.
Figure 5B:
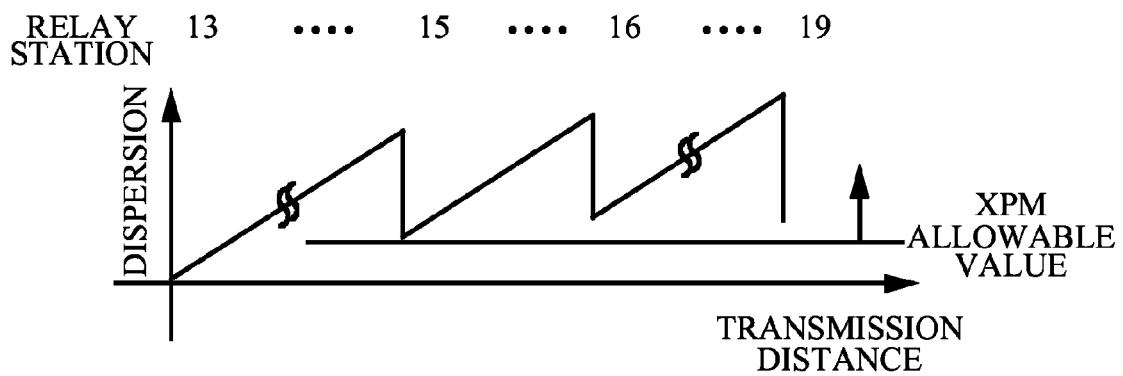

FIG. 5A and FIG. 5B are diagrams illustrating dispersion characteristics versus transmission distances of FIG. 4C and FIG. 4D. As illustrated in FIG. 5A, when the relay station 15 is the regenerative repeater station 50, the phase dispersion is almost 0 in the relay station 15. Therefore, in the relay station 16 through the reception end 19, the phase dispersion around 0 is compensated. Thus, the dispersion characteristic becomes around 0 which is below the XPM allowable value in the relay station 16 through the reception end 19, and the 40-Gbps dispersion characteristic is not satisfied. On the other hand, as illustrated in FIG. 5B, when the relay station 13 is the regenerative repeater station 50 and the relay station 15 is the non-regenerative repeater station 52, the dispersion around 0 is not compensated in the relay station 15. Therefore, in the relay station 16 through the reception end 19, the dispersion characteristic below the XPM allowable value is not compensated. Therefore, the 40-Gbps dispersion characteristic by the XPM becomes equal to or smaller than the allowable value.

As described above, even in a case where the transmission of 40-Gbps optical signals between regenerative repeater stations 50 is possible, there is a case that the transmission of 40-Gbps optical signals becomes impossible when the 10-Gbps optical signal is transmitted in addition to the 40-Gbps optical signal. On the other hand, as the intensity of the 10-Gbps optical signal is modulated, when the transmission of the 10-Gbps optical signal between regenerative repeater stations 50 is possible, the transmission becomes possible when the 40-Gbps optical signal is transmitted in addition to the 10-Gbps optical signal.

As described above, when transmitting optical signals at different transmission speeds, even though the transmission between regenerative repeater stations 50 is possible, there is a case that the transmission is impossible in the section included in the section between regenerative repeater stations 50. According to the first embodiment, it is possible to arrange the regenerative repeater station 50 properly even in such a case.

Figure 6:
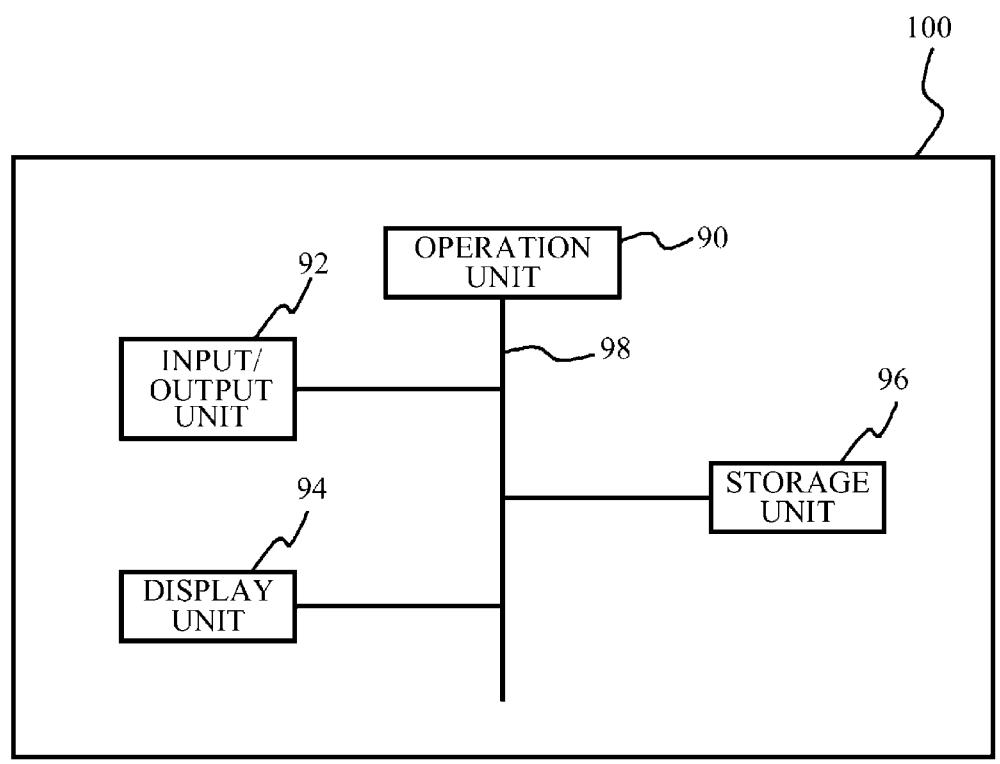
FIG. 6 is a block diagram illustrating a relay station arrangement device.

FIG. 6 is a block diagram of a relay station arrangement device that executes the arrangement of relay stations. The relay station arrangement device 100 is a computer for example, and includes an operation unit 90, an input/output unit 92, a display unit 94, a storage unit 96 and a bus 98. The operation unit 90 is a CPU (Central Processing Unit) for example, and executes a program (software) for calculation by using the data input from the input/output unit 92, and functions as a judgment unit, a determination unit, and an arrangement unit. The input/output unit 92 is a keyboard and an interface for example, and inputs data necessary for the calculation. In addition, it outputs the calculated data. The display unit 94 displays an image for data input. In addition, it displays the calculation results. The storage unit 96 stores data used for calculation. In addition, it stores the calculation result. The bus 98 connects the operation unit 90, the input/output unit 92, the display unit 94 and the storage unit 96.

Figure 7:
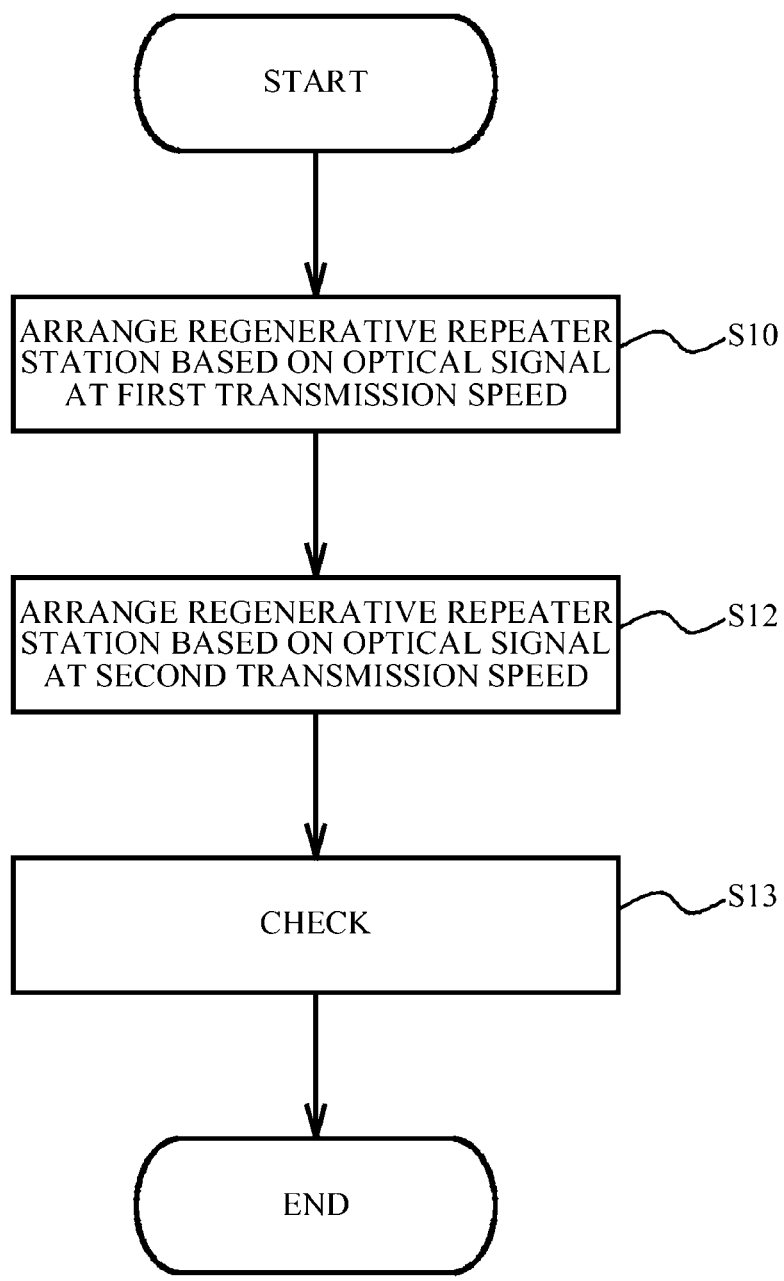
FIG. 7 is a flowchart illustrating a relay station arrangement method.

FIG. 7 is a flowchart illustrating an relay station arrangement method. As illustrated in FIG. 7, the operation unit 90 arranges the regenerative repeater station 50 based on the optical signal at the first transmission speed (e.g. 10 Gbps) (step S10). Then, the operation unit 90 arranges the regenerative repeater station 50 based on the optical signal at the second transmission speed (e.g. 40 Gbps) different from the first transmission speed (step S12). Then, whether the transmission at the first transmission speed and the second transmission speed is possible in the entire optical transmission system is checked (step S13). Here, as described in FIG. 4A through FIG. 5B, when the transmission of the optical signal at the first transmission speed is possible independently, the transmission of the optical signal at the second transmission speed is possible in addition to the transmission of the optical signal at the first transmission speed. On the other hand, there is a case that the transmission of the optical signal at the second transmission speed becomes impossible when the optical signal at the first transmission speed is transmitted in addition to the optical signal at the second transmission speed even though the transmission of the optical signal at the second transmission speed is possible independently.

Thus, as illustrated in FIG. 7, the regenerative repeater station 50 is arranged so that the transmission of the optical signal at the first transmission speed is possible as described in the step S10. Then, as described in the step S12, the regenerative repeater station 50 is additionally arranged so that the transmission of the optical signal at the second transmission speed becomes possible while maintaining the regenerative repeater station 50 arranged in the step S10. According to this, the relay station arrangement where the optical signal at the first transmission speed and the optical signal at the second transmission speed are possible can be carried out.

Figure 8:
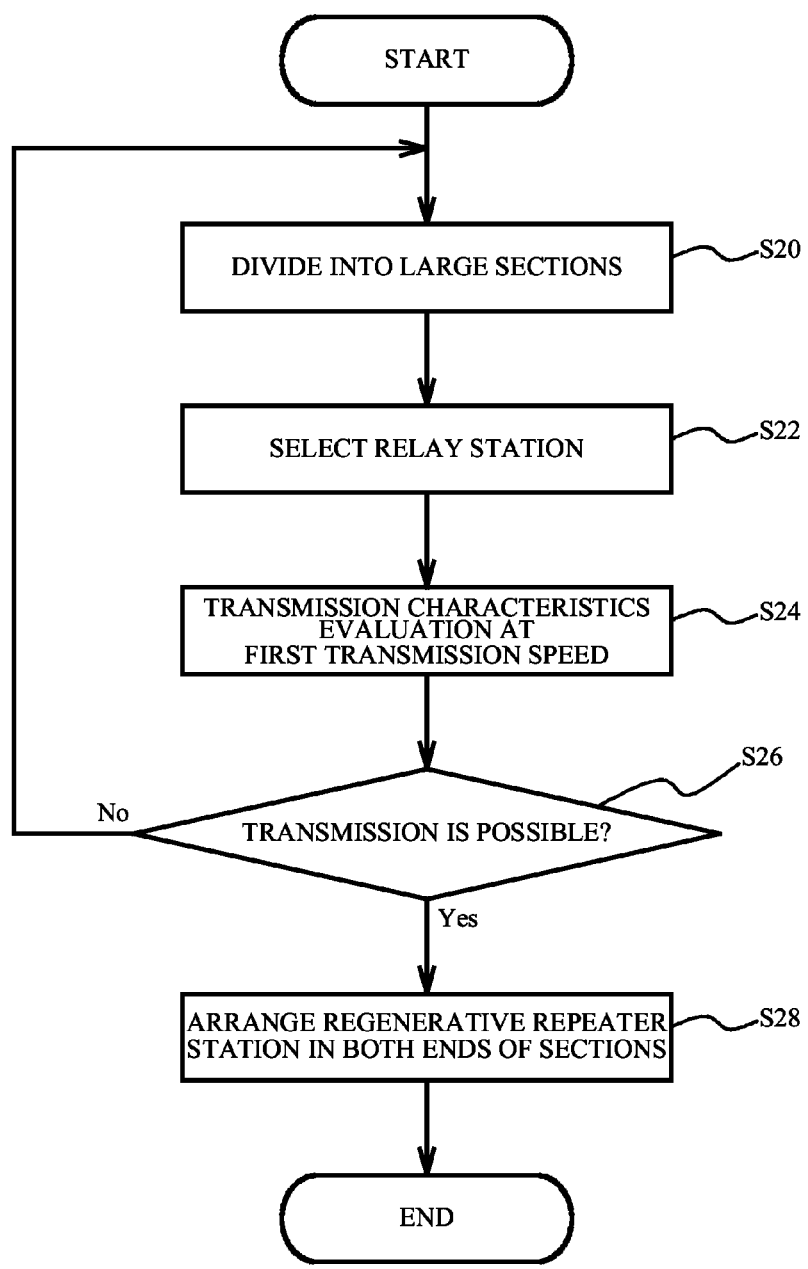
FIG. 8 is a flowchart illustrating an example of a step S10 in FIG. 7.

FIG. 8 is a flowchart illustrating an example of the step S10 in FIG. 7. As illustrated in FIG. 8, the operation unit 90 divides the optical transmission system network into large sections (step S20). Large sections may be ring-shaped, or linear. The operation unit 90 arranges regenerative repeater stations 50 in both sides of each large section, arranges non-regenerative repeater stations 52 in relay stations within large sections, and selects their types (step S22). For example, it selects the type of the ILA 32 and the bypass, and the type of the amplifier 40 and the DCM 42. The operation unit 90 evaluates transmission characteristics in each large section with the optical signal at the first transmission speed (step S24). For example, it evaluates the optical SN ratio and the dispersion characteristic. The operation unit 90 judges whether the optical signal can be transmitted through all the large sections (step S26). When the determination result is No, the operation unit 90 goes back to the step S20, and divides large sections again. When the determination result is Yes, it determines that the regenerative repeater station 50 is arranged in both ends of respective large sections (step S28). According to the above procedures, it is possible to arrange the regenerative repeater station 50 so that the optical signal at the first transmission speed can be transmitted.

Figure 9:
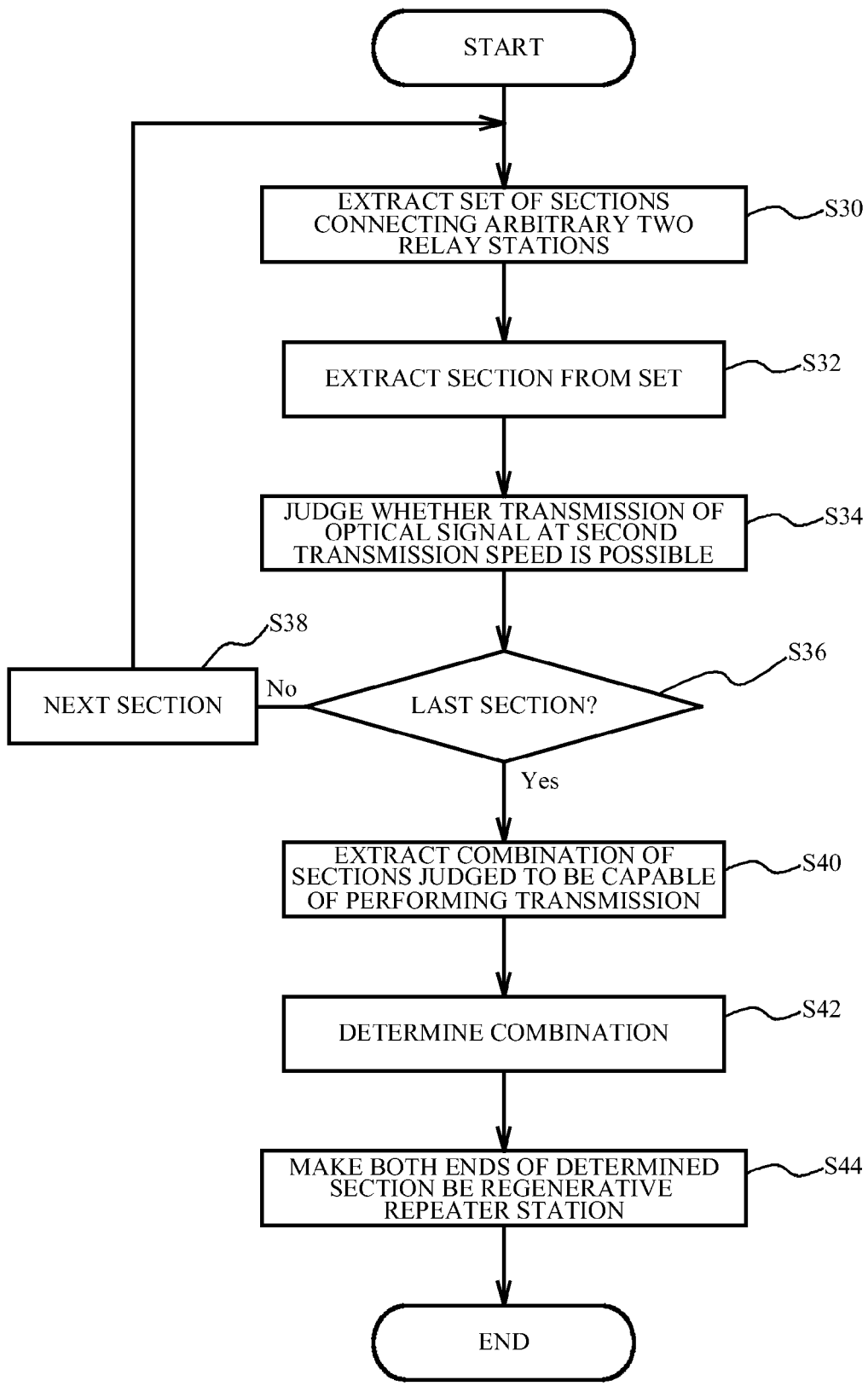
FIG. 9 is a flowchart illustrating an example of a step S12 in FIG. 7.

FIG. 9 is a flowchart illustrating an example of the step S12 in FIG. 7. The process of FIG. 9 is executed to each large section including relay stations arranged so as to be capable of transmitting the optical signal at the first transmission speed. The both ends of the large section are regenerative repeater stations 50, and relay stations other than both ends of the large section are non-regenerative repeater stations 52. The regenerative repeater station 50 at the transmission side is referred to as the transmission end, and the regenerative repeater station 50 at the reception side is referred to as the reception end. As illustrated in FIG. 9, the judgment unit of the operation unit 90 extracts a set of sections connecting two of relay stations (including the transmission end and the reception end) in which the regenerative repeater station 50 can be arranged (step S30). The relay station in which the regenerative repeater station can be arranged means a relay station in which the user determines that the regenerative repeater station 50 can be arranged for example.

The judgment unit of the operation unit 90 extracts one section from the set (step S32). The judgment unit of the operation unit 90 evaluates the transmission characteristics at the second transmission speed in the extracted section, and judges whether the transmission is possible (step S24). For example, the optical SN ratio and the dispersion characteristic are evaluated. The operation unit 90 determines whether the section is the last section (step S36). When the determination result is No, the next section is selected (step S38), and the process goes back to the step S32. When the determination result is Yes, the determination unit of the operation unit 90 extracts combinations of sections judged to be capable of performing transmission, the combination of sections enabling the transmission from the transmission end to the reception end (step S40). The determination unit of the operation unit 90 determines the most proper combination of sections from combinations of sections (step S42). The arrangement unit of the operation unit 90 determines the both ends of each section included in the determined combination as the relay station in which the regenerative repeater station 50 is to be arranged (step S44). According to above procedures, the regenerative repeater station 50 is arranged in the large section.

Figure 10:
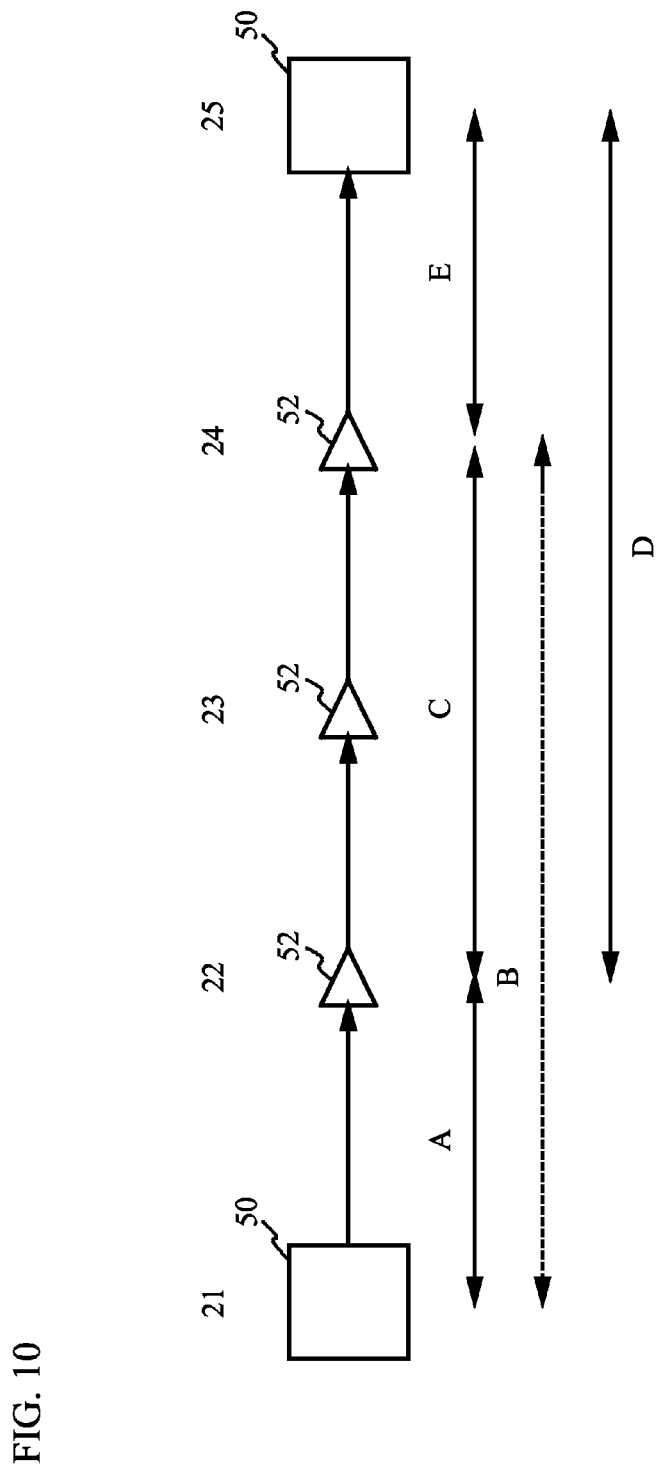
FIG. 10 is a diagram illustrating an example of arranging a regenerative repeater station according to the flowchart in FIG. 9.

FIG. 10 illustrates an example of arranging the regenerative repeater station 50 by a process of FIG. 9. According to the step S10 in FIG. 7, the regenerative repeater station 50 is arranged so that the transmission of the optical signal at the first transmission speed is possible. In FIG. 10 the transmission end 21 and the reception end 25 are the regenerative repeater stations 50 arranged by the procedure of the step S10. In the step S10, the relay stations 22 through 24 between the transmission end 21 and the reception end 25 are non-regenerative repeater stations 52. The regenerative repeater station 50 can be arranged in the relay stations 22 and 24 of the relay stations 22 through 24. The regenerative repeater station 50 cannot be arranged in the relay station 23.

In the step S30 of FIG. 9, a set of sections connecting two of relay stations 21, 22, 24 and 25 in which the regenerative repeater station 50 can be arranged, is extracted, relay stations 21, 22, 24 and 25 being located between the transmission end 21 and the reception end 25 including the transmission end 21 and the reception end 25 in which the regenerative repeater station 50 can be arranged. In FIG. 10, sections A, B, C, D and E are extracted. Table 1 indicates the input relay station and the output relay station of extracted sections.

TABLE 1

| SECTION | INPUT | OUTPUT | TRANSMISSION |
|---------|-------|--------|--------------|
| A | 1 | 2 | POSSIBLE |
| B | 1 | 4 | IMPOSSIBLE |
| C | 2 | 4 | POSSIBLE |
| D | 2 | 5 | POSSIBLE |
| E | 4 | 5 | POSSIBLE |

In the steps S32 through S38 in FIG. 9, it is evaluated whether the transmission of the optical signal at the second transmission speed is possible in each of sections A, B, C, D and E. A "TRANSMISSION" column of Table 1 indicates whether the transmission is possible in each section. The transmission is possible in sections A, C, D and E, but the transmission is impossible in the section B. As described, it is judged whether the transmission of the optical signal at the second transmission speed is possible in the section connecting arbitrary two of relay stations 21 through 25 in which the regenerative repeater station capable of regenerating the optical signal can be arranged. In FIG. 10, the section where the transmission is possible is illustrated with a solid line, and the section where the transmission is impossible is illustrated with a dashed line.

In the step S40 in FIG. 9, the combinations of sections judged to be capable of performing transmission that enables the transmission from the transmission end 21 to the reception end 25 is extracted. Table 2 indicates extracted combinations of sections. The combination No. 1 is a combination of sections A, C and E, and the combination No. 2 is a combination of sections A and D.

TABLE 2

| No. | COMBINATION | NUMBER OF REGENERATIVE REPEATER STATIONS | OSNR | DIVISION NUMBER |
|---|---|---|---|---|
| 1 | A-C-E | 2 | SN1 | D1 |
| 2 | A-D | 1 | SN2 | D2 |

In a step S42 of FIG. 9, the combination of sections judged to be capable of performing transmission that enables the transmission from the transmission end 21 to the reception end 25 is determined In Table 2, in a case of the combination No. 1, the number of regenerative repeater stations 50 to be added is two. Optical transmission characteristics from the transmission end 21 to the reception end 25 in the combination No. 1 is evaluated. As an evaluation result, assume that the optical SN ratio is SN1 and the dispersion characteristic is D1. In a case of the combination No. 2, the number of the regenerative repeater station 50 to be added is one. In regard to the optical transmission characteristics from the transmission end 21 to the reception end 25 in the combination No. 2, assume that the optical SN ratio is SN2 and the dispersion characteristic is D2. The determination of the most proper combination is carried out by the shortest path search method such as Dijkstra method by using at least one of a case where the number of regenerative repeater station 50 is small and a case where the signal quality such as the optical SN ratio and the dispersion characteristic is good as an weight. In FIG. 10, the combination No. 1 is determined for example.

In the step S42 of FIG. 9, regenerative repeater stations 50 are arranged in both ends of sections A and D in the determined combination. As the transmission end 21 and the reception end 25 are already regenerative repeater stations 50, the regenerative repeater station 50 is arranged in the relay station 22. With above procedures, an arrangement of the regenerative repeater station 50 in the large sections is completed.

According to the first embodiment, in steps S32 through S38 of FIG. 9 which judge whether the transmission is possible, as illustrated in FIG. 4D, the transmission at the second transmission speed is achieved in the section (section from the relay station 13 to 19) including multiple sections (e.g. the sections from the relay station 13 to 15 and the section from the relay station 15 to 19). However, as illustrated in FIG. 4C, the transmission at the second transmission is impossible in one of sections (e.g. the section from the relay station 15 to 19). Such a judgment condition is included. In such a case, as described in the step S32 of FIG. 9, the section connecting arbitrary two of multiple relay stations, in which the regenerative repeater station 50 capable of regenerating the optical signal can be arranged, is extracted. As described in the step S34, it is judged whether the transmission of the optical signal at the second transmission speed is possible. As described in the step S42, the combination of sections judged to be capable of performing transmission that enables the transmission of the optical signal from the transmission end to the reception end is determined. Consequently, the arrangement of the relay station illustrated in FIG. 4D is selected and the arrangement of the relay station illustrated in FIG. 4C is not selected. Therefore, it is possible to arrange the regenerative repeater station 50 in the optical transmission system properly.

In steps S32 through S38 of FIG. 9, all sections of sets extracted in the step S30 can be judged whether to be capable of performing transmission of the optical signal at the second transmission speed. According to this, the regenerative repeater station 50 can be arranged more properly.

As described in the embodiments, it is desirable that the second transmission speed is greater than the first transmission speed. In addition, it is desirable that the optical signal at the first transmission speed is an optical signal of which the intensity is modulated, and that the optical signal at the second transmission speed is the optical signal of which the phase is modulated. In this case, as described in FIG. 5A and FIG. 5B, even in a case where the transmission is possible in a section between two regenerative repeater stations 50, the transmission may be impossible in the section included in the section between two regenerative repeater stations 50. Accordingly, it is possible to arrange the regenerative repeater station 50 properly by using an arrangement method of the relay station of the first embodiment.

In addition, in the step S42 of FIG. 9, the combination of sections judged to be capable of performing transmission can be determined based on the number of sections from the transmission end 21 to the reception end 25. According to this, the number of regenerative repeater stations can be made small in the arrangement of the regenerative repeater station 50.

In addition, in the step S42 of FIG. 9, the combination of sections judged to be capable of performing transmission can be determined based on the signal quality of the transmission of the optical signal at the second transmission speed from the transmission end 21 to the reception end 25. The intensity of the optical signal can be used as signal quality in addition to the optical SN ratio and the dispersion characteristic in the reception end 19. According to this, the arrangement of the regenerative repeater station 50 with good signal quality can be achieved.

Furthermore, in the step S42 of FIG. 9, the combination of sections judged to be capable of performing transmission by using the shortest path search method can be determined. According to this, the regenerative repeater station 50 can be arranged more properly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A method for arranging relay stations in an optical transmission system including a plurality of relay stations arranged so that an optical signal at a first transmission speed can be transmitted from a transmission end to a reception end; the method comprising:

judging whether a transmission of an optical signal at a second transmission speed which is different from the first transmission speed in a section connecting arbitrary two of the plurality of relay stations in which a regenerative repeater station capable of regenerating an optical signal can be arranged is possible;

determining a combination of sections judged to be capable of performing transmission that enables a transmission of an optical signal from the transmission end to the reception end; and making both ends of respective sections of the determined combination be the relay stations where the regenerative repeater station is arranged, wherein in the judging, a judgment condition which is satisfied in a section including a plurality of sections but unsatisfied in one of the plurality of sections is included.

2. The method according to claim 1, wherein in the judging, whether a transmission of an optical signal at the second transmission speed different from the first transmission speed is possible is judged to all sections connecting arbitrary two of relay stations in which the regenerative repeater station capable of regenerating an optical signal can be arranged.

3. The method according to claim 1, wherein the second transmission speed is greater than the first transmission speed.

4. The method according to claim 1, wherein the optical signal at the first transmission speed is an optical signal of which an intensity is modulated, and the optical signal at the second transmission speed is an optical signal of which a phase is modulated.

5. The method according to claim 1, wherein in the determining, the combination of sections judged to be capable of performing transmission is determined based on the number of sections from the transmission end to the reception end.

6. The method according to claim 1, wherein in the determining, the combination of sections judged to be capable of performing transmission is determined based on a signal quality of transmission of the optical signal at the second transmission speed from the transmission end to the reception end.

7. The method according to claim 1, wherein in the determining, the combination of sections judged to be capable of performing transmission is determined by a shortest path search method.

8. A relay station arrangement device that arranges relay stations in an optical transmission system including a plurality of relay stations arranged so that an optical signal at a first transmission speed can be transmitted from a transmission end to a reception end, the relay station arrangement device comprising:

a judgement unit judging whether a transmission of an optical signal at a second transmission speed different from the first transmission speed is possible to a section connecting arbitrary two of the plurality of relay stations in which the regenerative repeater station capable of regenerating the optical signal can be arranged;

a determination unit determining a combination of sections judged to be capable of performing transmission that enables a transmission of the optical signal from the transmission end to the reception end; and an arrangement unit determining both ends of respective sections of the determined combination are the relay stations where the regenerative repeater station is to be arranged, wherein a judgment condition which is satisfied in a section including a plurality of sections but unsatisfied in one of the plurality of sections is included when the judgement unit judges whether the transmission is possible.

* * * * *